US008292552B2

(12) United States Patent
Chen

(10) Patent No.: US 8,292,552 B2
(45) Date of Patent: Oct. 23, 2012

(54) PUSHING STRUCTURE OF A METAL WORK DRILLING TOOL

(75) Inventor: Lung-Pao Chen, Jhubei (TW)

(73) Assignee: Sunmatch Industrial Co., Ltd., Hsinchu County (TW)

( * ) Notice: Subject to any disclaimer, the term of this patent is extended or adjusted under 35 U.S.C. 154(b) by 651 days.

(21) Appl. No.: 12/276,328

(22) Filed: Nov. 22, 2008

(65) Prior Publication Data

US 2010/0296885 A1 Nov. 25, 2010

(51) Int. Cl.
*B23B 45/14* (2006.01)
(52) U.S. Cl. ........................... 408/136; 408/111; 408/87
(58) Field of Classification Search .................. 408/136, 408/110, 111, 112, 87
See application file for complete search history.

(56) References Cited

U.S. PATENT DOCUMENTS

| | | | | | |
|---|---|---|---|---|---|
| 599,914 | A | * | 3/1898 | nitschmann | 408/99 |
| 963,924 | A | * | 7/1910 | mcsherry | 72/453.17 |
| 2,541,306 | A | * | 2/1951 | Taylor | 408/111 |
| 2,696,129 | A | * | 12/1954 | Riblet | 408/99 |
| 3,538,794 | A | * | 11/1970 | Grundmeyer | 408/92 |
| 3,967,687 | A | * | 7/1976 | Fowler | 173/32 |
| 3,985,188 | A | * | 10/1976 | Steele | 173/170 |
| 4,540,319 | A | * | 9/1985 | Michiharu | 408/100 |
| 4,582,456 | A | * | 4/1986 | Imai | 408/136 |
| 4,586,856 | A | * | 5/1986 | Waber | 408/92 |
| 4,669,929 | A | * | 6/1987 | Olesen | 408/100 |
| 5,046,900 | A | * | 9/1991 | Heiter et al. | 408/84 |
| 5,439,332 | A | | 8/1995 | Spitznagel | |

FOREIGN PATENT DOCUMENTS

| | | | | |
|---|---|---|---|---|
| DE | 2652930 | A | * | 5/1978 |
| JP | 63267107 | A | * | 11/1988 |
| JP | 04035805 | A | * | 2/1992 |

* cited by examiner

*Primary Examiner* — Eric A Gates
*Assistant Examiner* — Paul M Janeski
(74) *Attorney, Agent, or Firm* — Leong C. Lei

(57) ABSTRACT

A pushing structure of a metal work drilling tool includes a drill housing, a drill assembly, a push part and a feed trigger. The drill assembly is constituted by a drill bit, an extension rod and a power device. When drilling needs to be conducted, the feed trigger is pressed to drive the drill assembly forward that the drill bit gently contacts with the object for drilling; next, the drilling tool is activated and the feed trigger is pushed, then drilling force can be controlled effectively to improve a drilling efficiency and reduce a chance that the drill bit is broken due to percussion.

5 Claims, 5 Drawing Sheets

PUSHING STRUCTURE OF A METAL WORK DRILLING TOOL

BACKGROUND OF THE INVENTION a) Field of the Invention

The present invention relates to a metal work drilling tool, and more particularly to a pushing structure of a metal work drilling tool which can effectively control drilling force to improve a drilling efficiency and to reduce a chance that a drill bit is broken due to percussion.

b) Description of the Prior Art

As disclosed by the U.S. Pat. No. 5,439,332 and referring to FIG. 1, a pneumatic spot weld drill 1 is composed primarily of a drill assembly 10, a control valve 12 and a C-arm assembly 14, wherein the drill assembly 10 includes a trigger assembly 101 to supply pressurized gas, a spring 102 which is used to restore a piston assembly 103 and a motor assembly 105 which is provided with an extension rod 104. The motor assembly 105 can be used to rotate a drill bit 106. In addition, by the aforementioned control valve 12, the pressurized gas can be received and controlled to be led to the motor assembly 105, allowing the drill bit 106 to rotate and move. Furthermore, the C-arm assembly 14 is attached on the aforementioned drill assembly 10 and is provided with a locking assembly 140, such that a user can install and dismantle the C-arm assembly 14 as required. When the aforementioned trigger assembly 101 is pressed, the pressurized gas is supplied to the piston assembly 103, thereby pushing the drill bit 106 toward the C-arm assembly 14 and in a mean time, allowing the drill bit 106 to rotate and move.

However, upon using the aforementioned metal work drilling tool 1, following problems and shortcomings actually exist to be improved:

1. As the pushing mode of aforementioned pneumatic spot weld drill 1 utilizes a feed of pressurized gas to move the drill assembly 10 back and forth, pushing force cannot be controlled manually.
2. When the pressurized gas enters into the pneumatic spot weld drill 1, it will supply the drill assembly 10 to move reciprocally and the drill bit 106 to rotate, respectively. Thus, the pressurized gas will be separated into two parts to drive various parts to conduct different usage states, respectively. Therefore, the pushing force of drill assembly 10 will be insufficient, thereby reducing a working efficiency and extending a drilling time.
3. As the drill bit 106 contacts an object for drilling 2 by percussion, the drill bit 106 can be broken easily due to the percussion and therefore the drill bit 106 needs to be replaced frequently, which costs expensively.

Accordingly, how to eliminate the aforementioned problems and shortcomings of prior art is a technical issue to be solved by the present inventor and related vendors.

SUMMARY OF THE INVENTION

The primary object of the present invention is to provide a pushing structure of a metal work drilling tool which includes a drill housing, a drill assembly, a push part and a feed trigger, wherein the drill housing defines a column hole for placing the drill assembly, an end of the drill housing is provided with a depth positioning rack, the other end is extended with a fixing part, and a predetermined location of the drill housing close to the depth positioning rack is provided with a C-arm clip frame. The drill assembly is constituted by a drill bit, an extension rod and a power device. As the feed trigger is connected with the drill assembly, when drilling is to be conducted, an object for drilling is placed between the C-arm clip frame and the drill bit, the feed trigger is pressed to drive the drill assembly forward and the drill bit is gently in contact with the object for drilling, drilling force can be effectively controlled to improve a drilling efficiency and reduce a chance that the drill bit is broken due to percussion, by activating the drilling tool and pressing the feed trigger.

Another object of the present invention is to provide a pushing structure of a metal work drilling tool, wherein by using the feed trigger the drill assembly can move reciprocally in the column hole; thus, the drilling force can be effectively controlled, thereby improving the working efficiency and shortening the drilling time.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
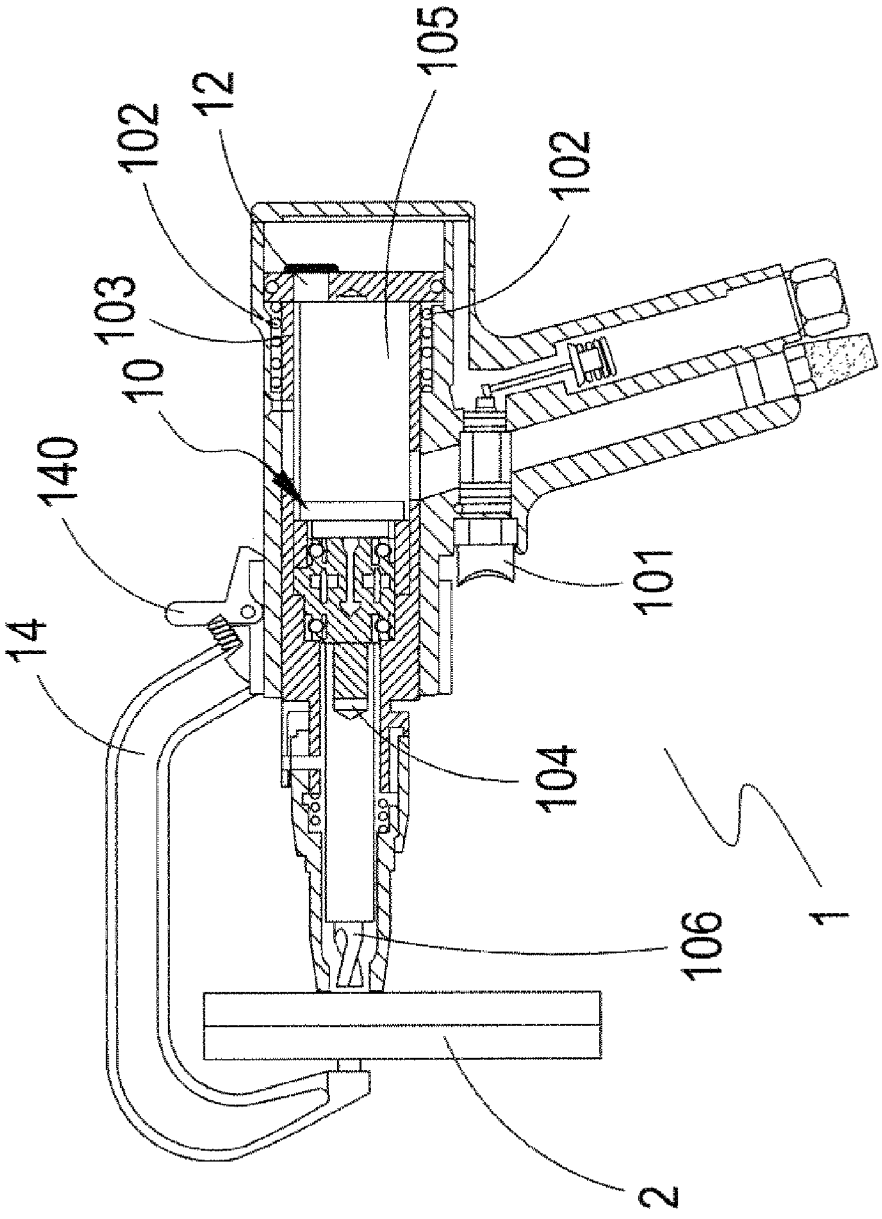
FIG.1 Prior Art
FIG. 1 shows a conventional metal work drilling tool.
Figure 2:
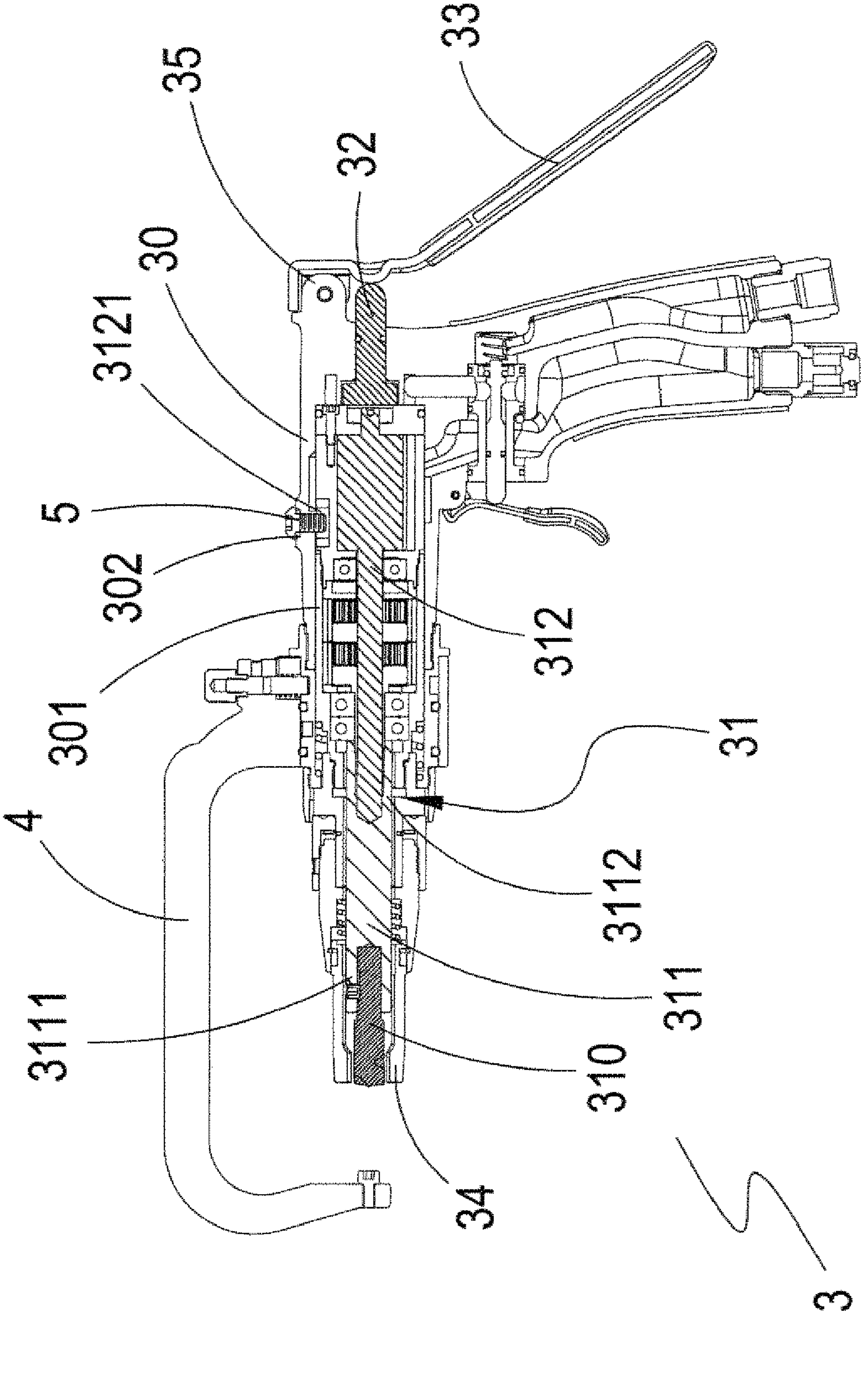
FIG. 2 shows a cutaway view of a preferred embodiment of the present invention.

Referring to FIG. 2, it shows a cutaway view of a preferred embodiment of the present invention. As shown in the drawing, a pushing structure of a metal work drilling tool 3, in accordance with the present invention, comprises a drill housing 30, a drill assembly 31, a push part 32 and a feed trigger 33, wherein the drill housing 30 defines a column hole 301 for placing the drill assembly 31, an end of the drill housing 30 is provided with a depth positioning rack 34, the other end is extended with a fixing part 35 which is pivoted with the feed trigger 33, and a pre-determined location of the drill housing 30 close to the depth positioning rack 34 is provided with a C-arm clip frame 4. The drill assembly 31 is constituted by a drill bit 31, an extension rod 311 and a power device 312 (such as a motor), wherein two ends of the extension rod 311 are formed respectively with a first positioning part 3111 and a second positioning part 3112 to fix the drill bit 310; whereas, the second positioning part 3112 is fixed with the power device 312, and the power device 312 is abutted with the push part 32. On the other hand, another pre-determined location of the drill housing 30 defines a positioning hole 302 for placing a guiding screw 5, and a side edge of the power device 312, corresponding to the positioning hole 302, is formed with a guiding slot 3121.

Figure 3:
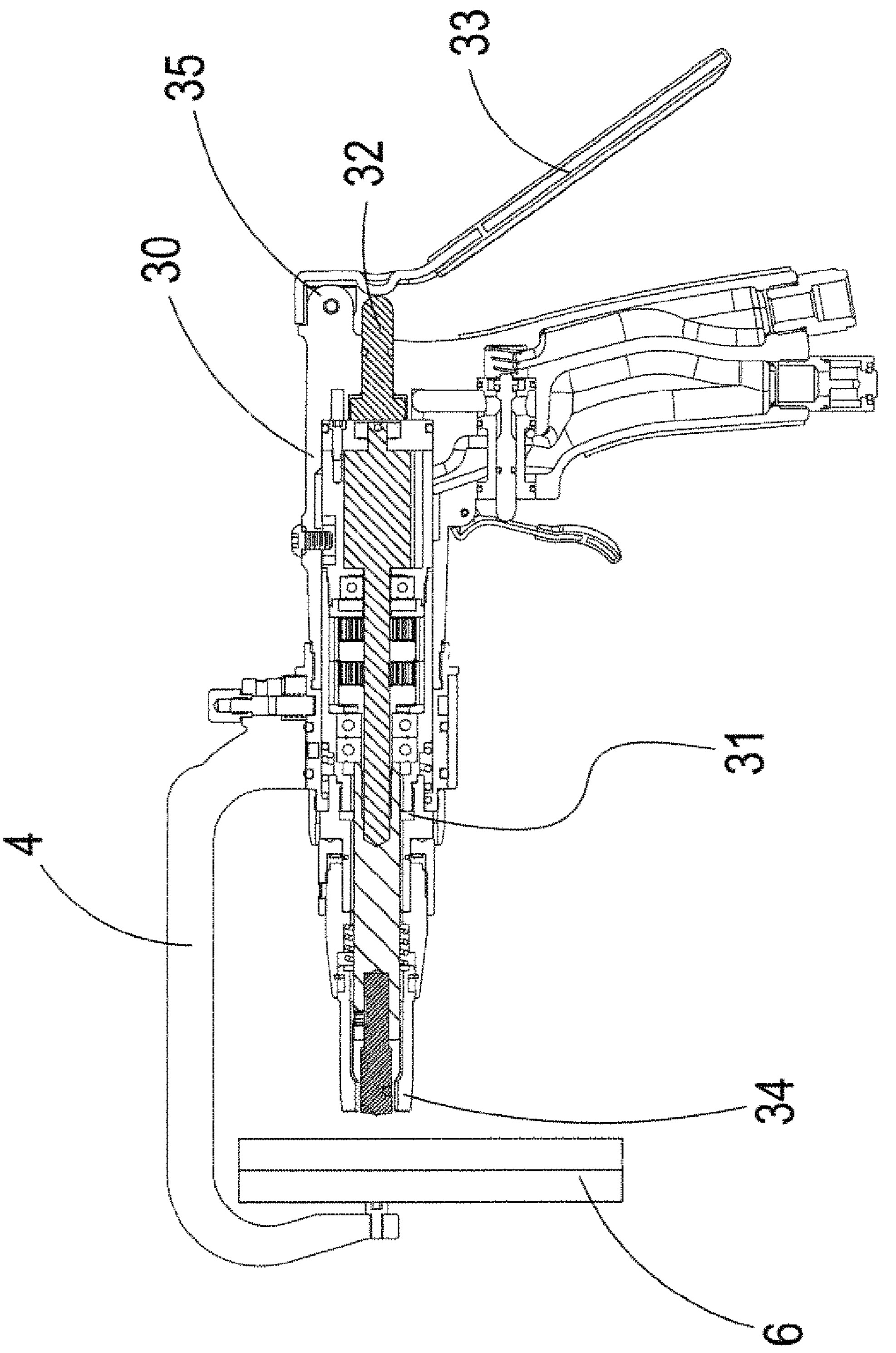
FIG. 3 shows a first schematic view of a cutaway operation of a preferred embodiment of the present invention.
Figure 4:
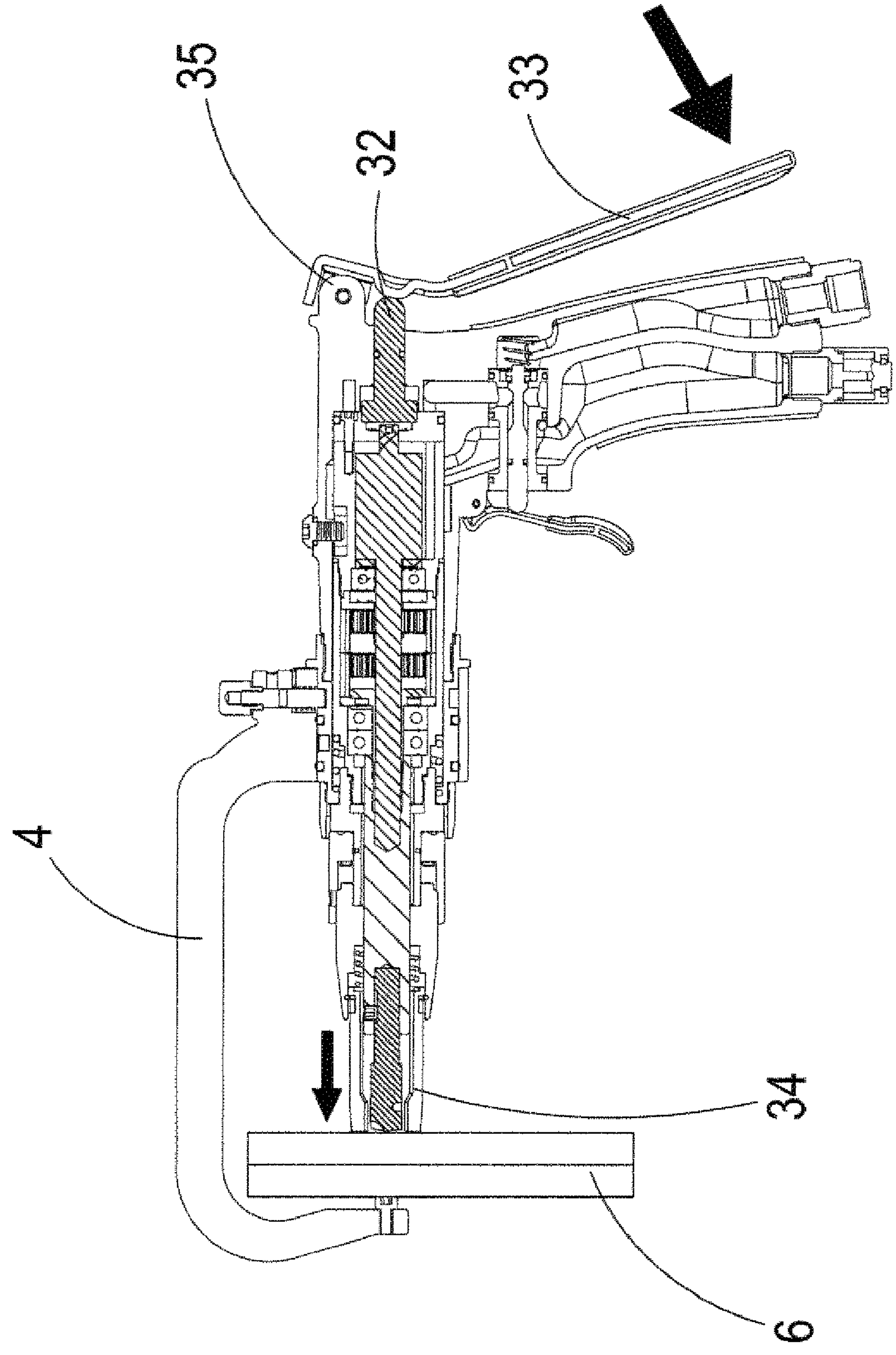
FIG. 4 shows a second schematic view of a cutaway operation of a preferred embodiment of the present invention.
Figure 5:
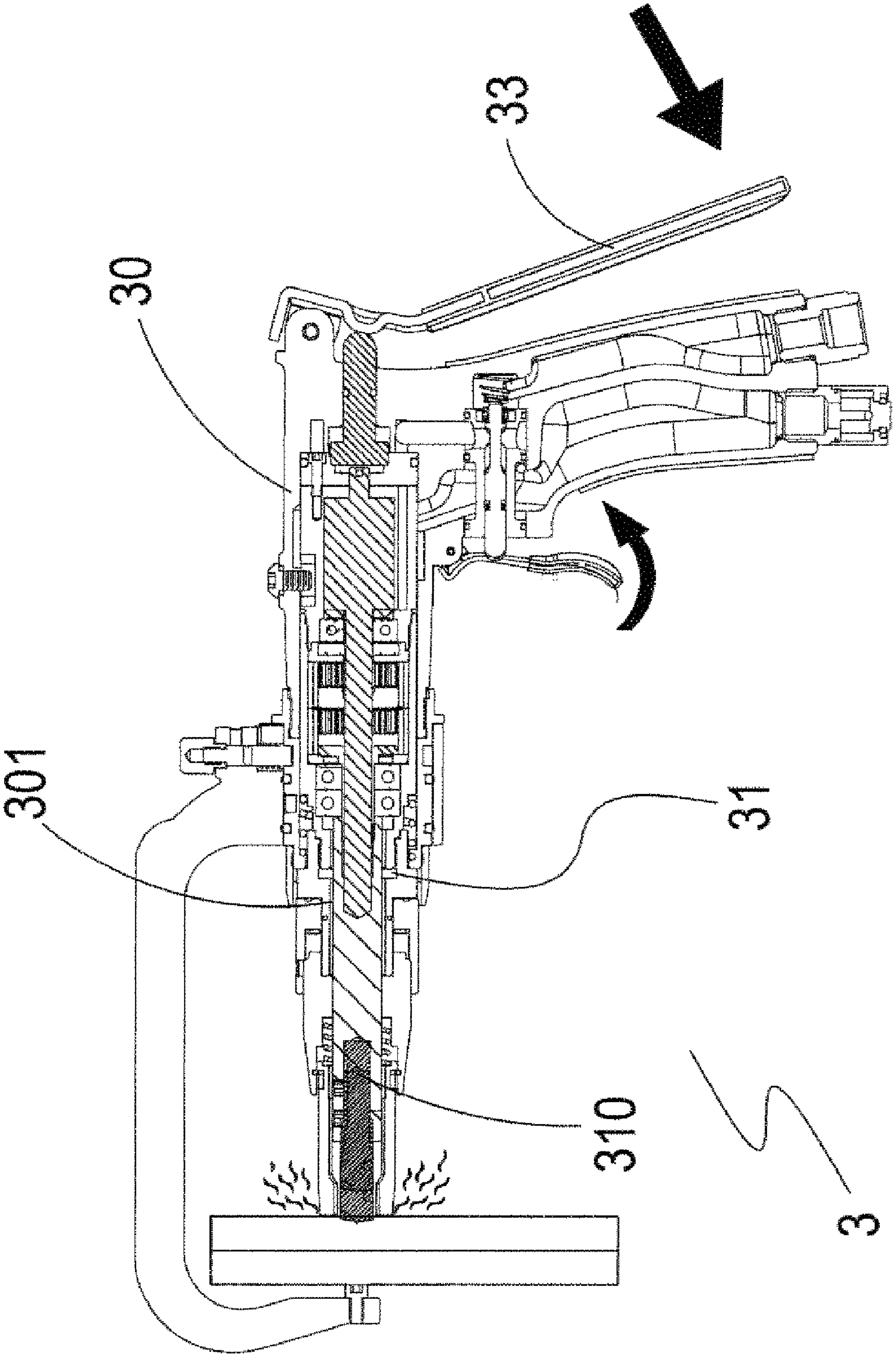
FIG. 5 shows a third schematic view of a cutaway operation of a preferred embodiment of the present invention.

Referring to FIGS. 3 to 5, it shows a first to third schematic view of a cutaway operation of a preferred embodiment of the present invention. As shown in the drawings, before an operator drills, as the fixing part 35 on the drill housing 30 is pivoted with the feed trigger 33, when the feed trigger 33 is pressed, the push part 32 will be abutted at a same time, allowing the push part 32 to drive the drill assembly 31. Accordingly, an object for drilling 6 is placed between the C-arm clip frame 4 and the drill bit 310 on the metal work drilling tool, and then the object for drilling 6 can be accurately aligned with the drill assembly 31, so as to improve an accuracy of drilling.

On the other hand, when implementing the drilling operation, the operator can control feed force through a feeling of pressing the feed trigger 33, which can also effectively control a forward speed of the drill bit 310 and reduce a chance that the drill bit 310 is broken due to percussion.

Accordingly, referring to all the drawings, the present invention actually exists following advantages in comparison with the prior art, upon using:

1. When the drilling is to be conducted, the object for drilling 6 is placed between the C-arm clip frame 4 and the drill bit 310, the feed trigger 33 is pressed to drive the drill assembly 31 forward, and the drill assembly 310 gently contacts with the object for drilling 6, the drilling force can be effectively controlled to improve the drilling efficiency and reduce the chance that the drill bit 310 is broken due to the percussion, by activating the drilling tool and pressing the feed trigger 33.
2. In addition, by using the feed trigger 33, the drill assembly 33 can move reciprocally in the column hole 301; thus, the drilling force can be controlled effectively, thereby improving the working efficiency and shortening the drilling time.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A pushing structure of a metal work drilling tool, comprising a drill housing, which defines a column hole, an end of which is provided with a depth positioning rack, and the other end of which that is far way from the depth positioning rack is extended with a fixing part; a drill assembly which is provided in the column hole; a push part, which is connected with the drill assembly and close to a side of the fixing part; and a feed trigger, which is locked with the fixing part and is abutted with the push part, wherein a pre-determined location of the drill housing defines a positioning hole for placing a guiding screw.

2. The pushing structure of a metal work drilling tool, according to claim 1, wherein a pre-determined location of the drill housing, close to the depth positioning rack, is provided with a C-arm clip frame.

3. The pushing structure of a metal work drilling tool, according to claim 2, wherein the drill assembly includes primarily a drill bit which is provided in the column hole and is close to the C-arm clip frame; an extension rod, two ends of which are formed respectively with a first positioning part and a second positioning part, the drill bit being fixed to the first positioning part; and a power device, which is fixed at the second positioning part and is abutted with the push part.

4. The pushing structure of a metal work drilling tool, according to claim 1, wherein a side edge of the power device, corresponding to the positioning hole, is provided with a guiding slot.

5. The pushing structure of a metal work drilling tool, according to claim 1, wherein the power device is a motor.

* * * * *